United States Patent
Wikkerink et al.

(10) Patent No.: US 10,053,298 B2
(45) Date of Patent: Aug. 21, 2018

(54) EGG ORIENTATION DEVICE

(71) Applicant: SANOVO TECHNOLOGY NETHERLANDS B.V., Aalten (NL)

(72) Inventors: Dirk Willem Wikkerink, Aalten (NL); Edwin Lambertus Maria Papen, Vorden (NL)

(73) Assignee: Sanovo Technology Netherlands B.V., Aalten (NL)

( * ) Notice: Subject to any disclaimer, the term of this patent is extended or adjusted under 35 U.S.C. 154(b) by 0 days.

(21) Appl. No.: 15/546,026

(22) PCT Filed: Jan. 28, 2016

(86) PCT No.: PCT/NL2016/050065
§ 371 (c)(1),
(2) Date: Jul. 25, 2017

(87) PCT Pub. No.: WO2016/129992
PCT Pub. Date: Aug. 18, 2016

(65) Prior Publication Data
US 2018/0002114 A1    Jan. 4, 2018

(30) Foreign Application Priority Data
Feb. 12, 2015   (NL) ...................................... 2014284

(51) Int. Cl.
*B65G 47/24*   (2006.01)
*A01K 43/00*   (2006.01)

(52) U.S. Cl.
CPC .............. *B65G 47/24* (2013.01); *A01K 43/00* (2013.01); *B65G 2201/0208* (2013.01)

(58) Field of Classification Search
CPC ................................ B65G 47/24; A01K 43/00
(Continued)

(56) References Cited

U.S. PATENT DOCUMENTS

| 2,919,787 A | * | 1/1960 | Reck | ....................... | A01K 43/00 |
| | | | | | 198/400 |
| 3,295,659 A | * | 1/1967 | Aidlin | ................ | B65G 47/1457 |
| | | | | | 193/44 |

(Continued)

FOREIGN PATENT DOCUMENTS

BE    371 707 A    8/1930

OTHER PUBLICATIONS

International Search Report for PCT/NL2016/050065 dated May 4, 2016.
Written Opinion for PCT/NL2016/050065 dated May 4, 2016.

*Primary Examiner* — William Ray Harp
(74) *Attorney, Agent, or Firm* — Nixon Peabody LLP; Jeffrey L. Costellia

(57) ABSTRACT

An egg orientation device is provided to position eggs downwards or upwards in egg retainers. The device includes a stationary lane with a support plate. The support plate includes a central zone and two lateral zones. The device also includes a pusher movable along the stationary lane and configured to push an egg over the support plate and around its longitudinal axis. The egg retainer is also movable in the beneath the support plate of the stationary lane in a synchronized manner with the pusher. A drop opening is provided in the support plate. The drop opening enables eggs to fall through such that they are positioned downwards or upwards in the egg retainer positioned beneath the drop opening. The drop opening is either located in the central zone or in the lateral zone.

11 Claims, 8 Drawing Sheets

(58) Field of Classification Search
USPC .................................. 198/382, 383; 209/707
See application file for complete search history.

(56) References Cited

U.S. PATENT DOCUMENTS 3,587,804 A * 6/1971 Marenco ................ B65G 47/24
                  193/47
3,612,245 A    10/1971 Noguchi \* cited by examiner

EGG ORIENTATION DEVICE

FIELD OF THE INVENTION

The present invention relates to an egg orientation device adapted to put eggs point down or point up in egg retainers.

BACKGROUND OF THE INVENTION

EP 0512585 discloses an egg orienting apparatus associated with a roller conveyor. At the reversing wheels of the conveyor lifting members and pushing members are arranged for lifting and turning the egg such that the smaller end is oriented to a predetermined position.

The invention has for an object to provide an alternative egg orienting device.

SUMMARY OF THE INVENTION

This object is achieved by an egg orientation device adapted to put eggs point down or point up in egg retainers, said egg orientation device comprising:

- a stationary lane having a support plate comprising a central zone and two lateral zones,
- a pusher movable in a conveying direction along the lane and adapted to push an egg such that it rolls over the support plate around its longitudinal axis,
- an egg retainer movable in the conveying direction beneath the support plate of the lane in a synchronised manner with the pusher, wherein at least one drop opening is provided in the support plate, which allows eggs to fall through and drop point down or point up in the egg retainer that is positioned underneath the drop opening, wherein the drop opening is located in the central zone or in at least one of the lateral zones for dropping the eggs in the egg retainer point up and point down respectively.

In one embodiment of the invention, in which the egg orientation device is adapted to put eggs point down in egg retainers, a drop opening is provided in each of the lateral zones of the support plate of the lane, which allows eggs to fall through and drop point down in the egg retainer that is located underneath the drop opening.

In another embodiment of the invention, in which the egg orientation device is adapted to put eggs point up in egg retainers, the support plate is such that the eggs will roll with their pointed end in one of the lateral zones and with their rounded end in the central zone along the lane, and a drop opening is provided in the central zone of the support plate of the lane, which allows eggs to fall through and drop point up in the egg retainer that is located underneath the drop opening.

According to the invention the position of the drop opening in the support plate determines if the egg drops point down or point up. The eggs are forced to roll over the stationary lane by the pusher. A rolling egg after a few turns will have moved with its pointed end to one of the lateral sides of the lane. If an opening is provided in either of the lateral zones of the support plate, the egg will arrive at one of the openings and lose its support at the pointed end whereby it tumbles with its point downwards through the opening. If an opening is provided in the central zone of the support plate, each one of the eggs in the lane will arrive with its rounded end at the opening and lose its support at the rounded end, whereby it tumbles point up through the opening. Thus the invention provides a device which is able to place the eggs point up and point down, respectively, independent of the initial orientation of the pointed end.

In a possible further embodiment of the egg orientation device adapted to put eggs point down in egg retainers, the drop openings in the respective lateral zones are in staggered positions along the lane.

In a further elaboration of this embodiment the egg retainer may be movable in the transverse direction from one lateral zone to the other lateral zone such that when the egg retainer moves in the conveying direction it will first move beneath one of the drop openings and then moves beneath the other one of the drop openings. This embodiment has the advantage that only one egg retainer is necessary for catching an egg in the lane independent of the orientation of the point to the one lateral side or the other lateral side. The retainer will first be below the most upstream opening and if the egg does not fall there the egg will fall in the other opening further downstream where the same retainer will have moved below.

In another possible embodiment of the egg orientation device adapted to put eggs point down in egg retainers, the drop openings are aligned in the conveying direction and wherein the lateral zones have a staggered configuration. In this embodiment the lane has a zigzag configuration, but the openings are aligned. The advantage is that the retainers moving below the lane can remain are in line with each other and do not have to be movable in transverse direction. This leads to a simpler moving structure.

In a possible embodiment of the egg orientation device adapted to put eggs point down in egg retainers, at the lateral zones in front of each drop opening, a lateral ridge is provided which is elevated with respect to the central zone of the support plate to such an extent that the eggs rolling along the lane are allowed to roll with their pointed end on one of the lateral ridges, wherein the ridge has a slanting end portion towards the drop opening to guide the pointed end of the egg towards the drop opening. The lateral ridge and the slanting end thereof enhance the orientation of the egg with the point into the drop opening. Thereby the risk of incorrect tumbling of the egg into the retainer is reduced.

In a possible embodiment of the egg orientation device adapted to put eggs point up in egg retainers, a lateral ridge is provided at the lateral zones, which is elevated with respect to the central zone of the support plate to such an extent that the eggs rolling along the conveying surface are allowed to roll with their pointed end on one of the lateral ridges. By this lateral edge the pointed end of the egg remains supported, while at the opening the rounded end of the egg loses support and the egg thus tumbles point up through the opening. A correct tumbling of the egg with the point up is thereby warranted.

In a possible further embodiment of any of the egg orientation devices described in the above, the pusher is connected to a circulating endless element.

In a possible further embodiment of any of the egg orientation devices described in the above, the egg retainer is connected to a circulating endless element.

Possibly the mentioned endless elements have a coupled drive mechanism.

In a possible further embodiment of any of the egg orientation devices described in the above, the device comprises a plurality of said lanes.

The invention will be elucidated in the following detailed description with reference to the drawings.

DETAILED DESCRIPTION

The general idea of the present invention relates to an egg orientation device adapted to put eggs in egg retainers. Such an egg orientation device according to the invention comprises a stationary lane having a support plate over which eggs are rolled. A pusher is present which moves in a conveying direction along the lane and pushes an egg such that it rolls over the support plate around its longitudinal axis. An egg retainer is movable in the conveying direction beneath the support plate of the lane in a synchronised manner with the pusher. A drop opening is provided in the support plate of the lane, which allows eggs to fall through and drop in the egg retainer that is located underneath the drop opening.

In practise there are two ways to drop the eggs in the egg retainers, i.e. point up or point down.

Figure 1:
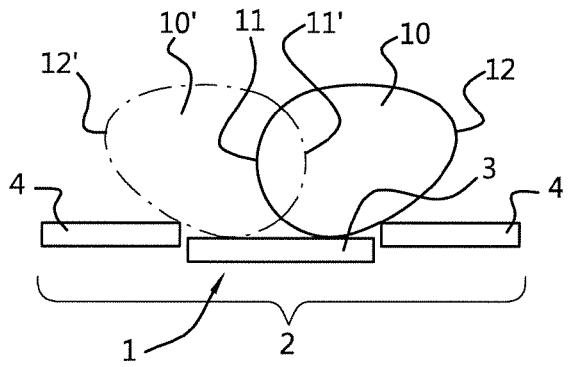
FIG. 1 shows schematically a front view of an egg on a support plate.
Figure 2:
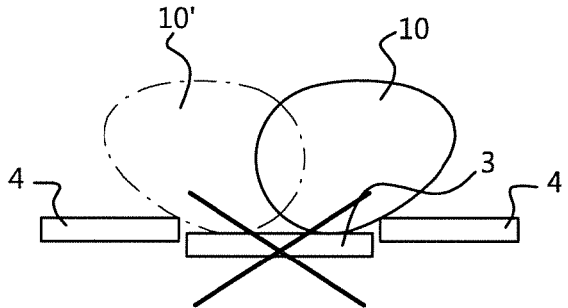
FIGS. 2 and 3 illustrate the removal of a support surface under a rounded end of the egg.

In FIGS. 1-4 is illustrated schematically the case wherein the egg is dropped point up in the egg retainer. In FIG. 1 is shown a stationary lane 1 including a support plate 2. Eggs 10 that roll over the support plate 2 around their longitudinal axis will have moved to the right after a few turns if their pointed end 12 is pointing to the right. Eggs 10' that roll over the support plate 2 will have moved to the left if their pointed end 12' is pointing to the left. This is due to the fact that the centre of gravity of an egg 10, 10' is located more towards the pointed end 12, 12', whereby the rolling egg 10, 10' tends to shift towards the side where the pointed end 12, 12' is.

The support plate 2 comprises a central zone 3 and two lateral zones 4. The egg 10, 10' rolls over the support plate 2 wherein a rounded end 11, 11' of the egg 10, 10' is located at the central zone 3, and the pointed end 12, 12' of the egg 10, 10' is located at one of the lateral zones 4, due to the effect mentioned above. This is illustrated by drawing one egg 10 (solid line) with the point to the right in the drawing and one egg 10' (dashed line) with the point to the left in the drawing.

Figure 3:
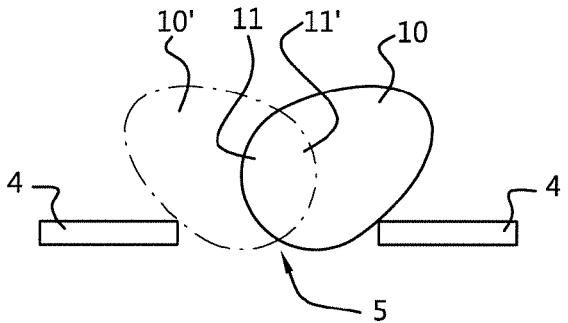
Figure 4:
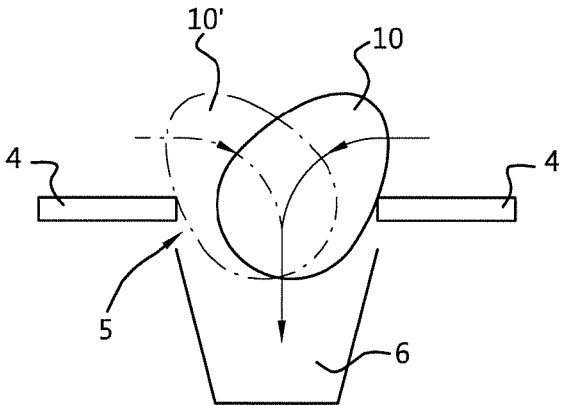
FIG. 4 illustrates the tumbling of the egg through an opening in the support plate into an egg retainer.

By removing the support of the egg 10,10' (illustrated in FIG. 2) at the rounded end 11, 11' the egg 10, 10' will tilt point up. The removed support is constituted by providing a drop opening 5 in the central zone 3 as is shown in FIG. 3. The rounded end 11, 11' will be able to fall down, while the egg 10, 10' is supported at the edge of the lateral zone 4. Thereby the egg 10, 10' tilts and is dropped point up in an egg retainer 6 that is positioned below the drop opening 5 as is illustrated in FIG. 4.

Figure 13:
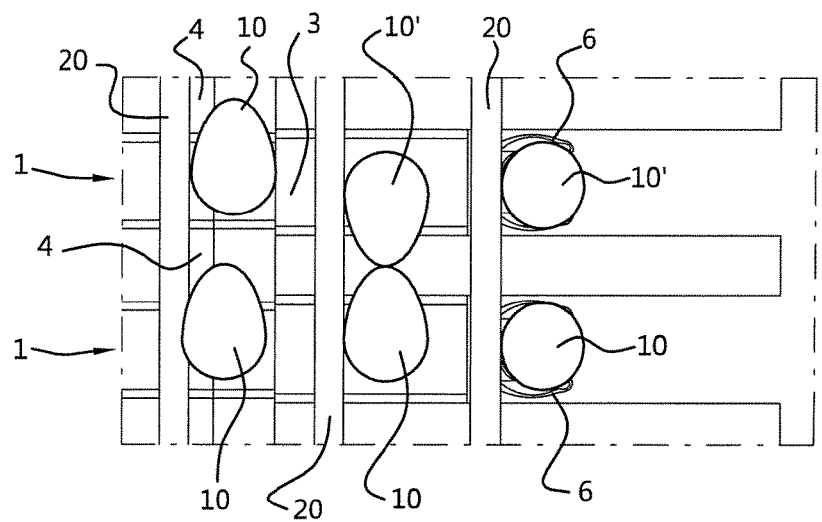
FIG. 13 shows a top view of a possible embodiment of an egg orientation device based on the principles illustrated in FIGS. 1-4.
Figure 14:
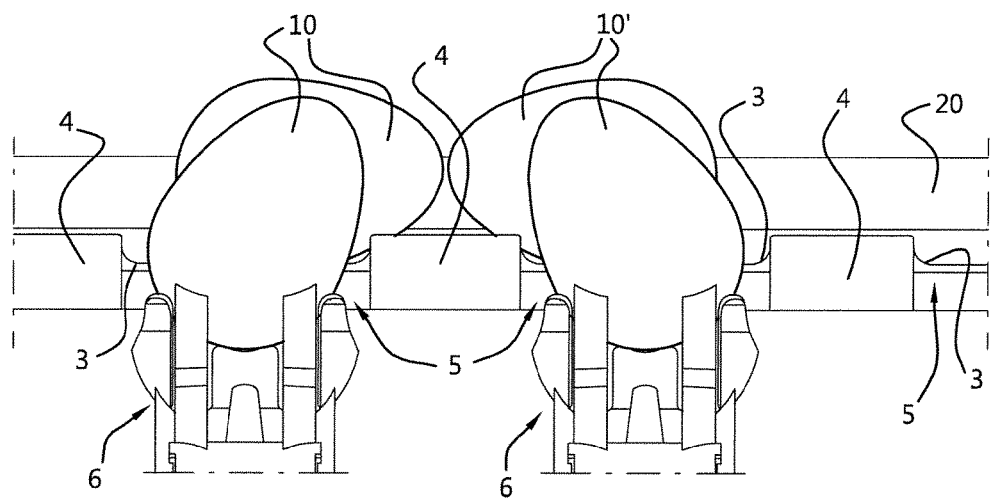
FIG. 14 shows a front view of the device of FIG. 13.

In FIG. 13 and FIG. 14 the orientation device illustrated schematically in FIGS. 1-4 is shown in more detail. The features mentioned above are indicated by the same reference numerals. In these figures also the pusher 20 is shown, which is formed by a rod that extends transverse over the lanes 1 and moves along the lanes 1, thereby pushing the eggs 10, 10' along the lanes 1. The rods 20, may be connected to a an endless chain 21 as is shown in FIG. 15.

Figure 15:
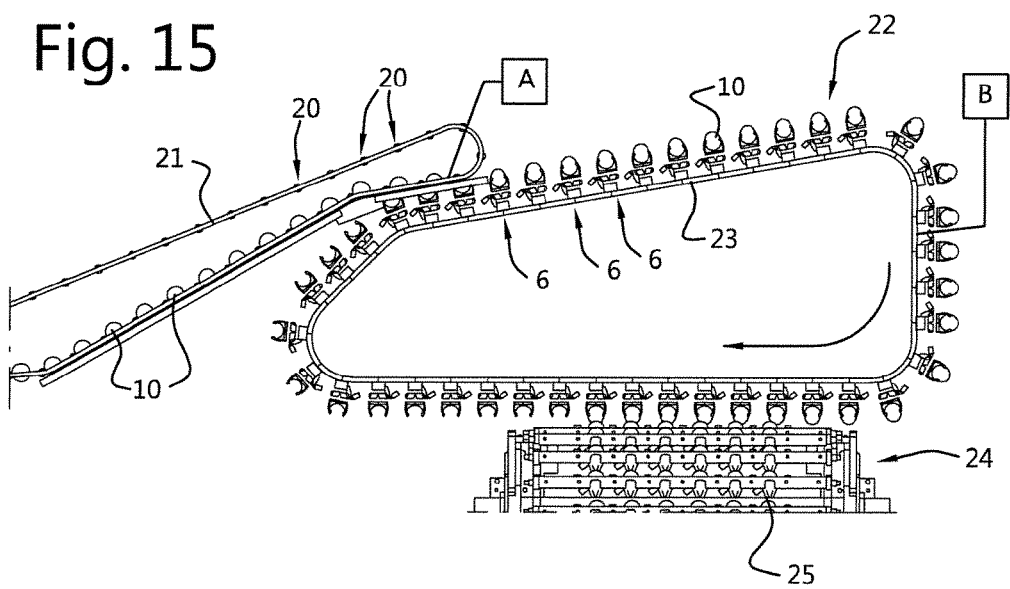
FIG. 15 shows a conveyor assembly including a device shown in FIGS. 13 and 14.

In FIG. 15 is shown an assembly of conveyors, where the orienting device (at A) drops the eggs 10 point up in egg retainers 6 on a first conveyor 22. The conveyor 22 has an endless element, in particular endless chain 23 to which the egg retainers 6 are fixed. The first conveyor 22 transfers the eggs 10 at a lower run to a second conveyor 24, wherein the eggs 10 are placed in egg pockets 25 in a point down orientation.

The movement of the endless chain 21 and of the endless chain 23 is synchronised, such that for each egg 10, 10' pushed forward by a rod 20, an egg retainer 6 will be below the drop opening 5.

In FIGS. 5-9 is illustrated schematically the case wherein the egg 10 is dropped point down in the egg retainer.

Figure 5:
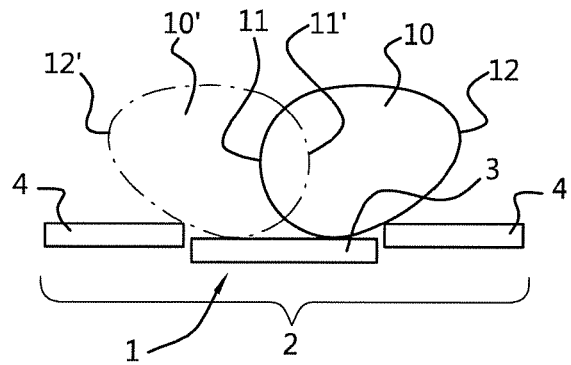
FIG. 5 shows schematically a front view of an egg on a support plate.
Figure 6:
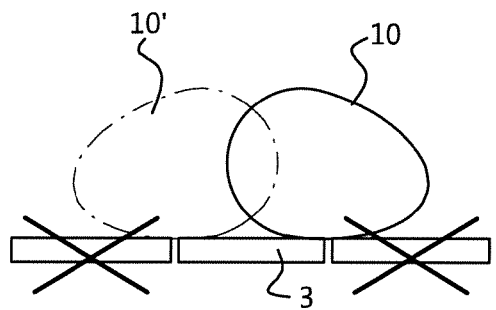
FIGS. 6 and 7 illustrate the removal of a support surface under a pointed end of the egg.

In FIG. 5 is shown the same situation as in FIG. 1. For a description is referred to the description with reference to FIG. 1.

Figure 7:
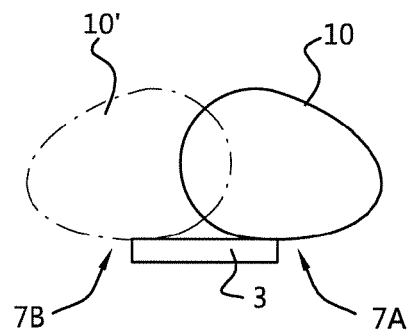
Figure 8:
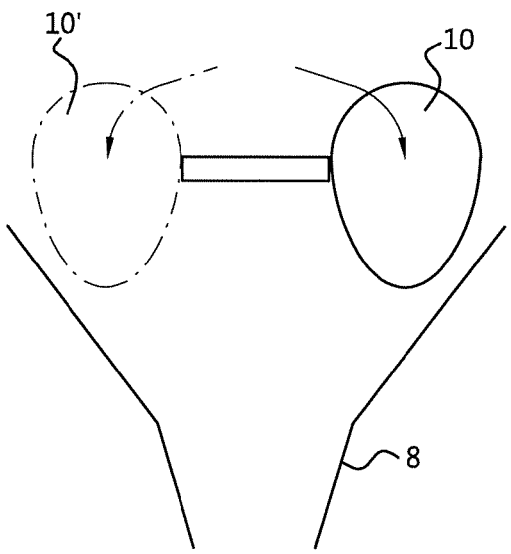
FIG. 8 illustrates the tumbling of the egg through an opening in the support plate into a an egg retainer.

By removing the support of the egg 10,10' (illustrated in FIG. 6) at the pointed end 12, 12' the egg 10, 10' will tilt point down. The removed support is constituted by providing a drop opening 7A, 7B in the lateral zone 4 as is shown in FIG. 7. The pointed end 12, 12' will be able to fall down, while the egg 10, 10' is supported at the edge of the central zone 3. Thereby the egg 10, 10' tilts and is dropped point down in an egg retainer 8 and 9 respectively that is positioned below the drop opening 7A, 7B as is illustrated in FIGS. 8 and 9 respectively.

When the eggs 10, 10' are dropped point down, they can fall either on the right side of the central zone 3 or on the left side. If the drop openings 7A, 7B are located at the same longitudinal level in the lane (cf. FIG. 8), the eggs oriented to either side and thus falling to either side must be received on either side. Since the egg retainers catching the eggs from one lane, preferably also form one lane, the retainers should either be a retainer 8 having a sort of funnel shape to be able to catch eggs from either side.

Figure 9:
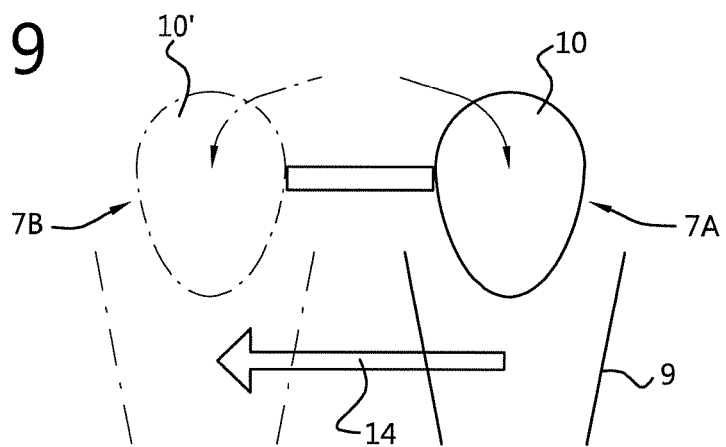
FIG. 9 illustrates the tumbling of the egg through an opening in the support plate into another egg retainer.

A more practical feasible option is to provide the drop openings 7A, 7B in a staggered manner seen in the longitudinal direction of the lane 1 and provide an egg retainer 9 which is movable in the transverse direction as is illustrated in FIG. 9 by the arrow 14.

Figure 11:
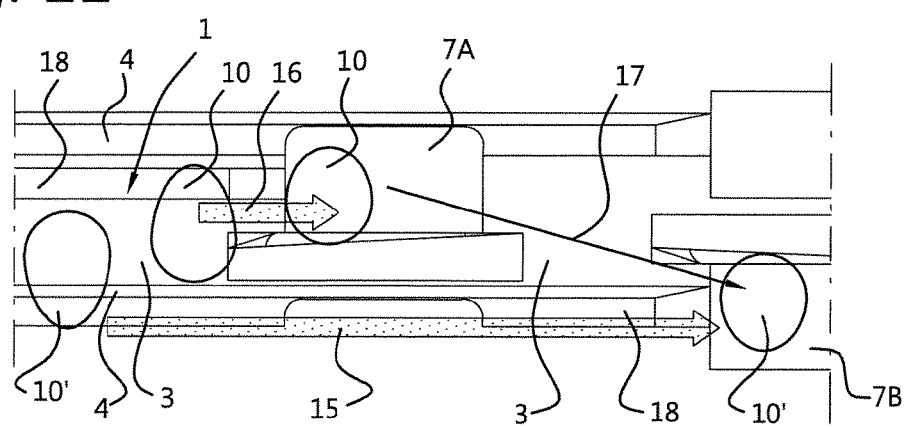
FIG. 11 shows a top view of a lane of another possible embodiment of an egg orientation device based on the principles illustrated in FIGS. 5-7.

In FIG. 11 is shown a stationary lane 1 in which eggs 10, 10' are pushed forward as is indicated by the arrows 15 and 16. The eggs 10 with their pointed end (in the figure upwards) to one side will first encounter a drop opening 7A and will fall through the opening 7A. The egg retainer 9 is then below opening 7A (see FIG. 9 on the right). The eggs 10' that are oriented with their point towards the other side will roll past the opening 7A (indicated by arrow 15) and will encounter a drop opening 7B. The eggs 10' will fall through the opening 7B in the associated egg retainer 9 which was first below the opening 7A (but the egg 10' does not fall in there) is in the meantime moved in a transverse direction towards the other side. The egg retainer 9 also advances simultaneously in the conveying direction. The resultant oblique movement of the egg retainer 9 is indicated in FIG. 11 by arrow 17.

Figure 12:
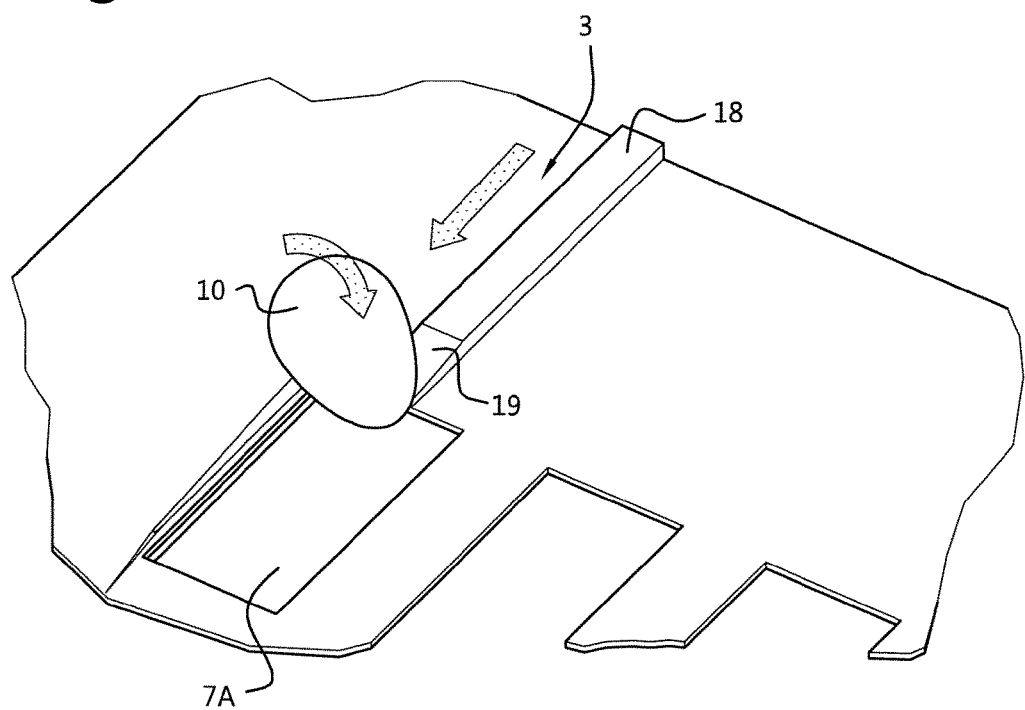
FIG. 12 shows a detail of the device of FIG. 11.

In FIG. 12 is shown that at the lateral zones 4 in front of each drop opening a lateral ridge 18 is provided which is elevated with respect to the central zone 3 of the support plate 2 to such an extent that the eggs 10, 10' rolling along the lane 1 are allowed to roll with their pointed end 12, 12' on one of the lateral ridges 18. The ridge 18 has a slanting end portion 19 towards the drop opening 7A, 7B to guide the pointed end 12, 12' of the egg 10, 10' towards the drop opening 7A, 7B.

Figure 10:
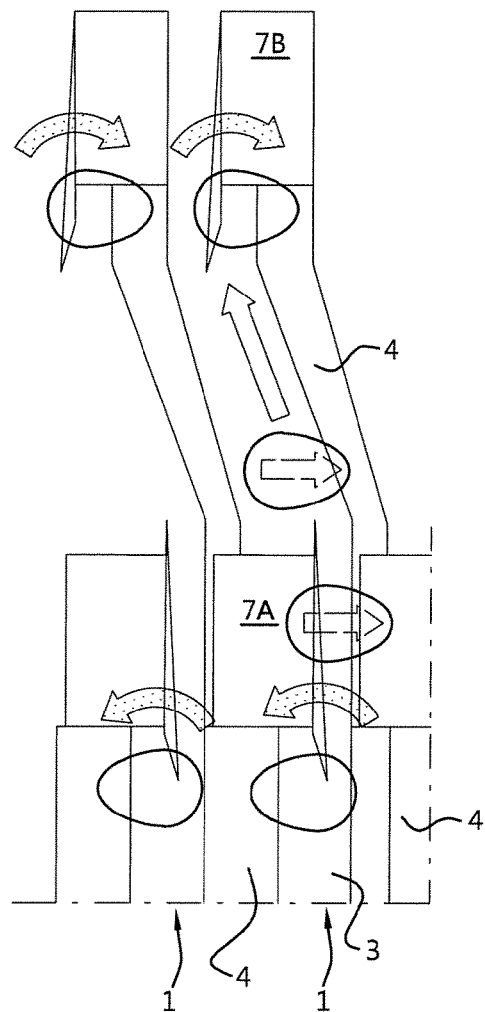
FIG. 10 shows a top view of two lanes of a possible embodiment of an egg orientation device based on the principles illustrated in FIGS. 5-7.

In FIG. 10 a different embodiment is shown two adjacent stationary lanes 1. In each lane 1 the drop openings 7A and 7B are aligned in the conveying direction (i.e. longitudinal direction). The lateral zones 4 have a staggered configuration. In this embodiment the lane 1 has a zigzag configuration, but the openings 7A and 7B are aligned. The advantage is that the egg retainers moving below the lane can remain are in line (thus comparable to egg retainer 6, cf. FIG. 4) with each other and do not have to be movable in transverse direction.

Figure 16:
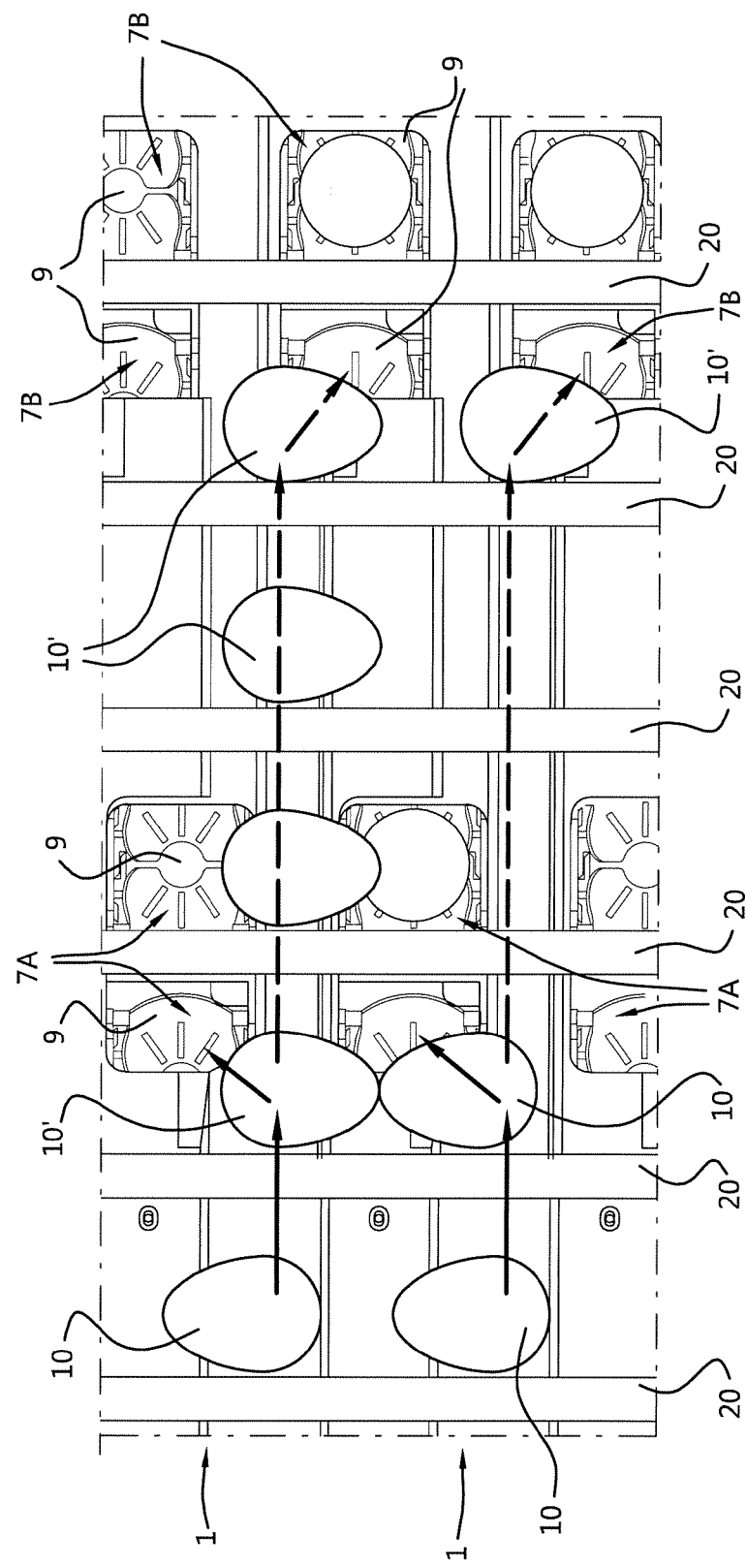
FIG. 16 shows a top view of a possible embodiment of an egg orientation device based on the principles illustrated in FIGS. 5-7 and 9.
Figure 17:
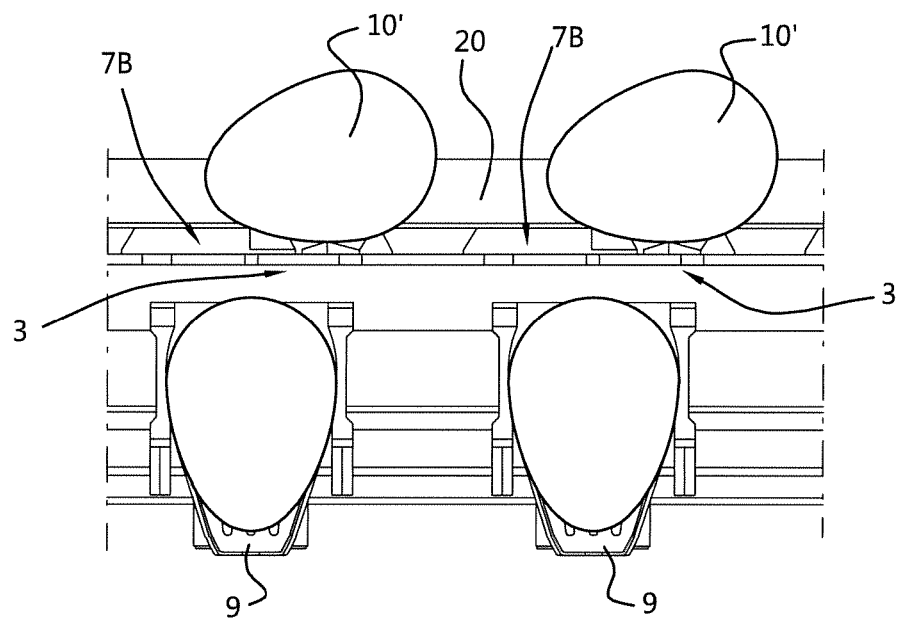
FIG. 17 shows a front view of the device of FIG. 16.

In FIG. 16 and FIG. 17 the orientation device illustrated schematically in FIGS. 5-7 and 9 is shown in more detail. The features mentioned above are indicated by the same reference numerals. In these figures also the pusher 20 is shown, which is formed by a rod that extends transverse over the lanes 1 and moves along the lanes 1, thereby pushing the eggs 10, 10' along the lanes 1. The rods 20, may be connected to a an endless chain 21 as is shown in FIG. 15.

The invention claimed is:

1. An egg orientation device adapted to put eggs point down or point up in egg retainers, said egg orientation device comprising:
    a stationary lane having a support plate comprising a central zone and two lateral zones,
    a pusher movable in a conveying direction along the lane and adapted to push an egg such that it rolls over the support plate around its longitudinal axis,
    an egg retainer movable in the conveying direction beneath the support plate of the lane in a synchronised manner with the pusher,
    wherein at least one drop opening is provided in the support plate, which allows eggs to fall through and drop point down or point up in the egg retainer that is positioned underneath the drop opening,
    wherein the drop opening is located in the central zone or in at least one of the lateral zones for dropping the eggs in the egg retainer point up and point down respectively.

2. The egg orientation device according to claim 1, wherein in each of the lateral zones of the support plate of the lane one of said drop openings is provided, which allows eggs to fall through and drop point down in the egg retainer that is positioned underneath the drop opening.

3. The egg orientation device according to claim 2, wherein the drop openings in the respective lateral zones are in staggered positions along the lane.

4. The egg orientation device according to claim 3, wherein the egg retainer is movable in the transverse direction from one lateral zone to the other lateral zone such that when the egg retainer moves in the conveying direction it will first move beneath one of the drop openings and then moves beneath the other one of the drop openings.

5. The egg orientation device according to claim 2, wherein the drop openings are aligned in the conveying direction and wherein the lateral zones have a staggered configuration.

6. The egg orientation device according to claim 2, wherein at the lateral zones in front of each drop opening a lateral ridge is provided which is elevated with respect to the central zone of the support plate to such an extent that the eggs rolling along the lane are allowed to roll with their pointed end on one of the lateral ridges, wherein the ridge has a slanting end portion towards the drop opening to guide the pointed end of the egg towards the drop opening.

7. The egg orientation device according to claim 1,
    wherein the support plate is such that the eggs will roll with their pointed end in one of the lateral zones and with their rounded end in the central zone along the lane, and
    wherein the drop opening is provided in the central zone of the support plate of the lane,
    wherein at the lateral zones a lateral ridge is provided which is elevated with respect to the central zone of the support plate to such an extent that the eggs rolling along the conveying surface are allowed to roll with their pointed end on one of the lateral ridges.

8. The egg orientation device according to claim 1, wherein the pusher is connected to a circulating endless element.

9. The egg orienting device according to claim 1, wherein the egg retainer is connected to a circulating endless element.

10. The egg orienting device according to claim 1, wherein the pusher is connected to a circulating endless element and the egg retainer is connected to a circulating endless element, wherein said endless elements have a coupled drive mechanism.

11. The egg orientation device according to claim 1, wherein the device comprises a plurality of said lanes.

* * * * *